Patented Oct. 27, 1931

1,829,110

UNITED STATES PATENT OFFICE

GEORGE A. RICHTER, OF BERLIN, NEW HAMPSHIRE, ASSIGNOR TO BROWN COMPANY, OF BERLIN, NEW HAMPSHIRE, A CORPORATION OF MAINE

PURIFICATION OF CELLULOSE FIBER

No Drawing.   Application filed May 28, 1930. Serial No. 456,803.

One of the major problems incident to the purification of cellulose fiber is the removal of the non-alpha cellulose components associated therewith while preserving its alpha cellulose content. The usual process of purification, which involves digesting the fiber in an alkaline liquor, e. g., in a caustic soda solution, effects an extraction of less stable celluloses in the fiber, but this is accompanied by a partial conversion of alpha cellulose into lower forms of cellulose which, in turn, are partly or wholly dissolved in the alkaline liquor. Accordingly, for a given increase in alpha cellulose content in the fiber, there is a greater than corresponding loss of fiber in the process.

I have found that a cuprammonium solution is not only highly effective in extracting non-alpha cellulose components from cellulose fiber, but further that this extraction may be made highly selective on the less stable celluloses, such as beta, gamma, and oxycellulose, if the copper and/or ammonia content of the solution is maintained at values much lower than those of the cuprammonium solutions used for determining the solution viscosities of cellulose fibers or for dissolving all the fiber or for spinning into artificial silk. Such solutions may, therefore, be employed to great advantage in the purification of cellulose fibers to produce yields of refined pulp suitable both for papermaking and for cellulose derivative preparation exceeding those obtained in the usual refining process.

The cuprammonium solution which is generally employed for measuring the solution viscosity of cellulose fiber contains 21.2 grams of copper and 257 grams of ammonia per liter of copper. It may be prepared by dissolving cuprous oxide in the strong ammoniacal solution or by causing the ammoniacal solution to pass over copper turnings in the presence of air. The clear blue cuprammonium solution thus obtained is quite stable, particularly in the presence of small amounts of sugar. The cuprammonium solutions which I employ are prepared in a similar way, but they are much lower in chemical content, especially in copper content. The desired action on the undesirable components of the fiber may be effected quite readily at room temperature, but the composition of the treating solution most suitable for the treatment, as well as the time of treatment, varies with the different fibers which it is desired to purify.

I shall now cite various examples of procedure in each of which different types of fibers and cuprammonium solution of different strengths falling within the purview of the present invention were used.

*Example I.*—A bleached sulphite pulp having an alpha cellulose content of 85%, a soda soluble content of 16.7%, and a solution viscosity of 1.6 was used as a raw material. The soda soluble determination is used, more particularly in the nitrocellulose industry, as a measure of the oxycellulose content of the pulp. The pulp was treated for thirty minutes at 20° C., with a cuprammonium solution containing 5.2 grams of copper and 196 grams of ammonia per liter, at the end of which time the product was washed and dried, and the yield of dry product found to be 90.8%, based on the weight of dry pulp used as a raw material. The product had an alpha cellulose content of 92.5%, a soda soluble content of 11.5%, and a solution viscosity of 1.98.

*Example II.*—The procedure of the foregoing example was repeated, but using a cuprammonium solution containing 2.8 grams of copper and 196 grams of ammonia per liter. Such a procedure resulted in a yield of 96.8% of a product having an alpha cellulose content of 89.2%.

*Example III.*—A previously refined and bleached wood pulp having an alpha cellulose content of 94.7% was used as a raw material. It had a gamma cellulose content of 3.34%, a copper number of 1.44, and a soda soluble content of 7.49%. The copper number determination is used, more particularly in the paper industry, as a measure of the oxycellulose content of the pulp. The pulp was treated for thirty minutes at 20° C. with a cuprammonium solution containing 5.6 grams of copper and 196 grams of ammonia per liter, as a result of which a yield of 96% of a product containing 97.1% alpha cellulose was realized. The gamma cellulose content of the product was 1.11%, its copper number 1.26; and its soda soluble content 3%.

*Example IV.*—A cotton linters having an alpha cellulose content of 97% and a solution viscosity of 2.46 was used as a raw material. Its treatment was effected with a cuprammonium solution containing 2.8 grams of copper and 196 grams of ammonia per liter, under the same conditions as those employed in the previous examples. The resulting product had an alpha cellulose content of 97.6% and a viscosity of 2.6.

In all the examples hereinbefore given, a material purification of the fiber is effected without sacrificing as much fiber as is the case when a similar purification is accomplished in solutions of boiling alkali. In other words, the cuprammonium solutions employed are of a composition effecting a substantially selective reaction on less stable celluloses, including beta, gamma, and oxycellulose. The increase in solution viscosity effected in all cases indicates that the less stable celluloses, including oxycellulose, are responsible for the lower viscosity of the fiber used as a raw material. This conclusion is further borne out by the fact that when determining the solution viscosity of various fibers with the standard cuprammonium solution hereinbefore described, some fibers go into solution quite readily, while others require a considerable period of time for complete solution, the less stable celluloses, such as beta, gamma, and oxycellulose, dissolving quickly to form a syrup of very low viscosity. The use of a standard solution which is of a composition prescribed to dissolve all the fiber is not, however, attended by great selectivity of reaction, even during the initial stage of treatment.

The process of the present invention, aside from making possible high yield of refined fiber, possesses merit, in that it may be practised at room temperature, under which condition it may be completed in a relatively short period of time. In fact, temperature of treatment does not appear to be a factor of importance within reasonable limits above and below room temperature; and the time of treatment does not appear to be a major factor, since a thirty-minute exposure of the fiber to the treating solution seems to be quite sufficient to complete the purification. While the ammonia content and the copper content of the cuprammonium solution may be varied within rather wide limits, depending upon the type of fiber to be purified and the final product desired, nevertheless, in any case, the concentration of these chemicals is far below the chemical concentration of a cuprammonium solution capable of effecting a solution of all the fiber. It may, however, be advantageous to treat the fiber with the cuprammonium solution under superatmospheric pressure conditions, in which case lower chemical concentration than that required at atmospheric pressure is necessary to effect a given purification of the fiber in a definite period of time, particularly if the temperature of the solution is, say, 40° to 80° C. and the pressure is that resulting largely from the vapor pressure of the ammonia at such temperatures.

A process of purifying fiber, such as hereinbefore described, may be practised to advantage while the fiber is in continuous flow, for instance, through a two-tank system, the fiber and cuprammonium solution being continuously fed into the top of one tank from the bottom of which it is passed into the bottom of the second tank, from the top of which it is continuously removed in the desired purified condition after sufficient time of contact with the cuprammonium solution. The fiber is then washed free of solution, preferably in a countercurrent washing machine designed to produce a wash water effluent concentrated in treating chemicals. It may be desirable to treat the washed pulp with ammoniated water to remove slight traces or residues of copper, as when the fiber is to be converted into derivatives or is to be put to uses where the presence of such copper is disadvantageous. A large proportion of the ammonia used in the process may be recovered by subjecting the treated pulp associated with the cuprammonium solution, or the wash water effluent, to vacuum treatment and, if desired, heat treatment. The ammonia gas thus obtained may be condensed and used for the preparation of fresh cuprammonium solution.

I claim:

1. A process which comprises treating cellulose fiber with a cuprammonium solution of a sufficiently low chemical concentration to be capable of effecting a substantially selective action on the non-alpha cellulose components of the fiber.

2. A process which comprises treating cellulose fiber with a cuprammonium solution of a chemical concentration far below that capable of effecting a complete solution of all the fiber.

3. A process which comprises treating cellulose fiber with a cuprammonium solution containing much less than 21.2 grams of copper per liter to effect an extraction of the non-alpha cellulose components of the fiber.

4. A process which comprises treating wood pulp with a cuprammonium solution containing less ammonia and far less copper than that necessary to dissolve the pulp to effect an extraction of non-alpha cellulose components present therein.

5. A process which comprises treating bleached wood pulp at about room temperature with a cuprammonium solution containing copper and ammonia in sufficiently small amount to effect a substantially selective action on the non-alpha cellulose components of the pulp.

6. A process which comprises treating cellulose fiber with a cuprammonium solution to remove substantially only components of low solution viscosity present therein and thus to increase the solution viscosity of the fiber.

In testimony whereof I have affixed my signature.

GEORGE A. RICHTER.